United States Patent [19]

Giggard et al.

[11] 4,351,445

[45] Sep. 28, 1982

[54] BAIL HANGERS FOR PAINT CANS AND THE LIKE

[75] Inventors: Earl D. Giggard, Clarendon Hills; Nick S. Khoury, Worth; John J. Kowalik, Glenview; Donald R. Terrien, Naperville, all of Ill.

[73] Assignee: The Continental Group, Inc., Stamford, Conn.

[21] Appl. No.: 192,137

[22] Filed: Sep. 29, 1980

[51] Int. Cl.³ ........................ B23P 17/00; B65D 25/32

[52] U.S. Cl. ........................................ 220/91; 29/433; 29/434; 72/324; 72/362; 220/95

[58] Field of Search ............... 113/1 J, 120 J; 29/505, 29/509, 510, 512, 511, 513, 433, 434; 220/91, 95, 92; 72/324, 362

[56] References Cited

U.S. PATENT DOCUMENTS

| | | | |
|---|---|---|---|
| 393,144 | 11/1888 | Cragin | 220/92 |
| 447,821 | 3/1891 | Griswold et al. | 220/91 |
| 1,015,355 | 1/1912 | Stollberg | 220/92 |
| 1,225,725 | 5/1917 | Wagandt | 220/91 |
| 1,514,930 | 11/1924 | Reynolds | 220/91 X |
| 1,869,348 | 7/1932 | Rollason | 220/91 |
| 1,907,038 | 5/1933 | Burns | 220/91 X |
| 1,912,542 | 6/1933 | Rollason | 220/91 |
| 1,938,353 | 12/1933 | Rollason | 220/91 |
| 2,936,928 | 5/1960 | Henchert | 220/91 |
| 3,193,133 | 7/1965 | Woodward | 220/91 |
| 3,261,053 | 7/1966 | Lesher | 220/95 X |

*Primary Examiner*—Allan N. Shoap
*Attorney, Agent, or Firm*—John J. Kowalik

[57] ABSTRACT

A paint can having a curl about its upper open end, the curl being fabricated at diametrically spaced areas to provide means for attachment of a bail.

7 Claims, 13 Drawing Figures

BAIL HANGERS FOR PAINT CANS AND THE LIKE

BACKGROUND OF THE INVENTION

Containers of the type under consideration which require a carrying bail typically have had bail ears either soldered, welded or crimped to the can body. This not only is a costly procedure but also causes the coating normally applied to the interior of the container to be burned or to crack or flake off thus exposing the base ferrous metal which then rusts.

DESCRIPTION OF THE PROBLEM

As stated, current manufacture and application of bail ears is expensive. Also the use of such containers, which are usually made of steel, for water based latex paints causes rusting problems which contaminate the paint. At times the metal rusts through and the can then leaks.

SOLUTION OF THE PROBLEM

The present invention is directed to a novel paint pail or can which has a rolled or curled annular upper edge which is formed to provide an attachment for the bail.

A primary object of the invention is to provide a novel container having a simple and inexpensive bail attachment and a plug and securement therefor.

Another object is to form a container with an outturned curl which is fashioned to provide a bail ear from the material of the curl.

These and other objects and advantages inherent in and encompassed by the invention will become more apparent from the specification and the drawings wherein.

Figure 5:
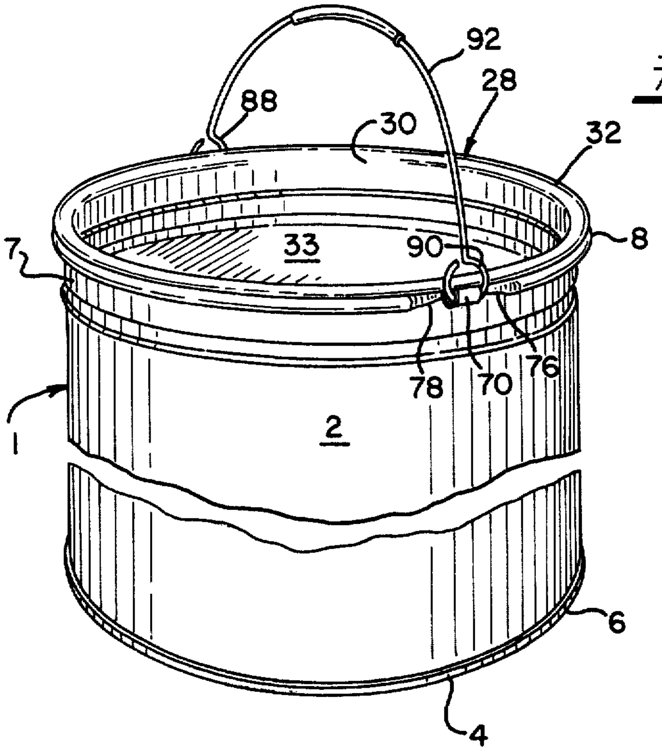
FIGS. 5–8 illustrate a further embodiment of the invention.
Figure 7:
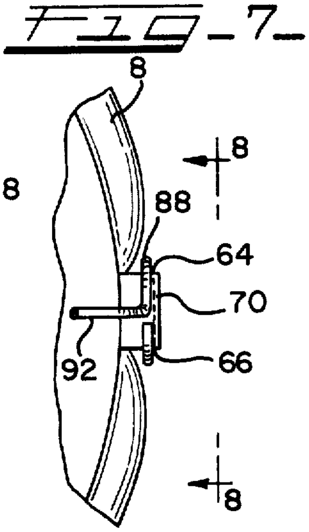
Figure 6:
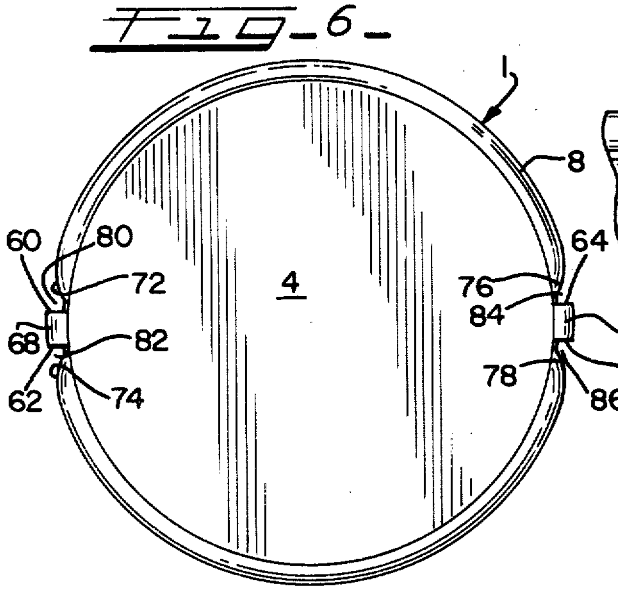
Figure 8:
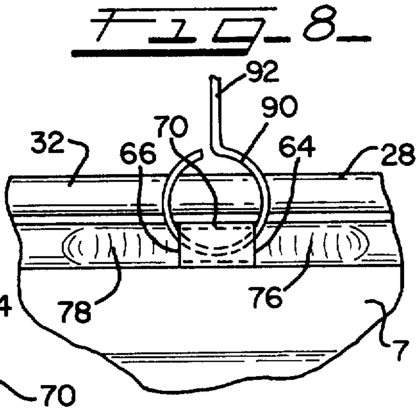
Figure 9:
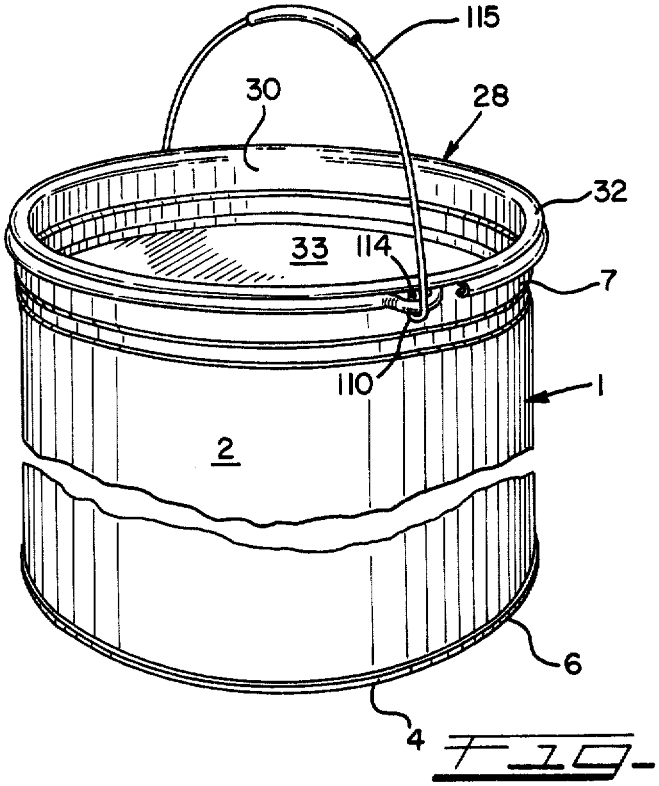
Figure 11:
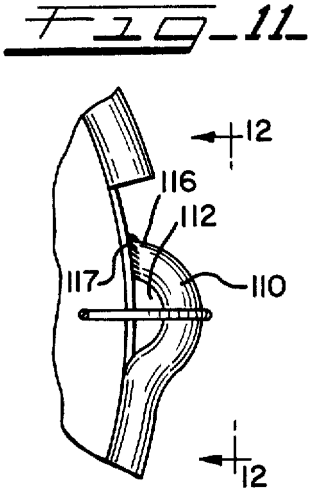
Figure 13:
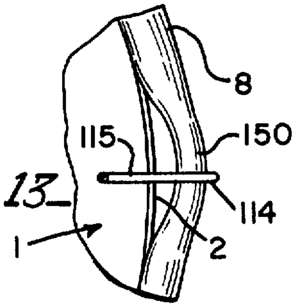
Figure 10:
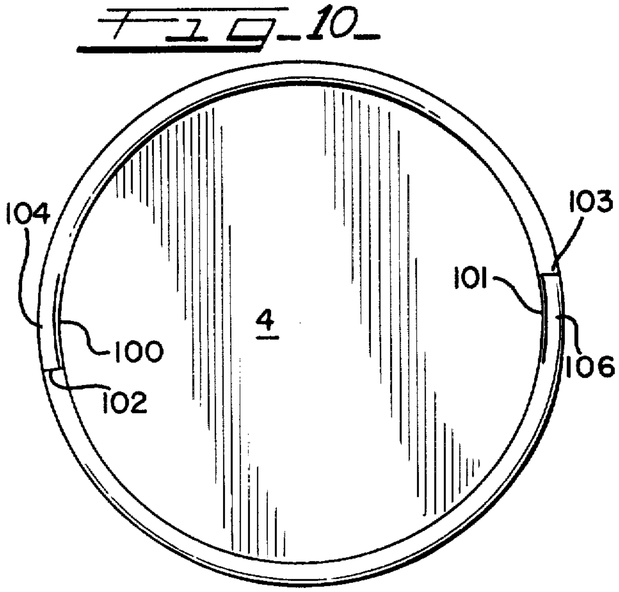
Figure 12:
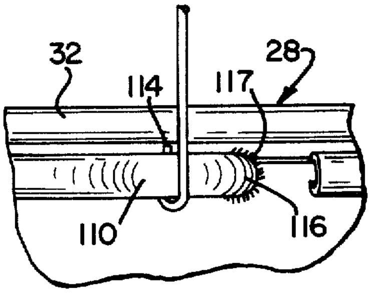

FIG. 5 being a perspective view thereof;

FIG. 6 is a top plan view thereof with the bail removed;

FIG. 7 being an enlarged fragmentary top plan view thereof with the bail applied; and FIG. 8 being a side elevational view taken substantially on line 8—8 of FIG. 7;

FIGS. 9–12 illustrate another embodiment of the invention;

FIG. 9 being a perspective view thereof;

FIG. 10 a top plan view thereof with the cover removed and the curl lanced preparatory to forming of the bail ears;

FIG. 11 is a fragmentary enlarged top plan view thereof showing the bail ears formed; and FIG. 12 is a fragmentary side elevational view taken substantially on line 12—12 of FIG. 11; and FIG. 13 is a fragmentary top plan view illustrating a further embodiment of the invention.

DESCRIPTION OF FIGS. 1–4

The invention is shown in connection with a metal, preferably steel, container 1 having a cylindrical body 2 with a bottom 4 double seamed thereto at 6 or formed integral therewith.

The upper end portion of the body is formed along its upper edge with an outturned curl 8 of tubular form somewhat triangular in cross-section in at least the bail attachment regions and includes an upper end portion 10 of the body which merges into an apex 12 along the upper edge of the can. An outer depending diagonal wall 14 (FIG. 3) extends from the apex 12 and merges into an apex 16 from which extends an inwardly and upwardly curled bottom wall 17.

Figure 1:
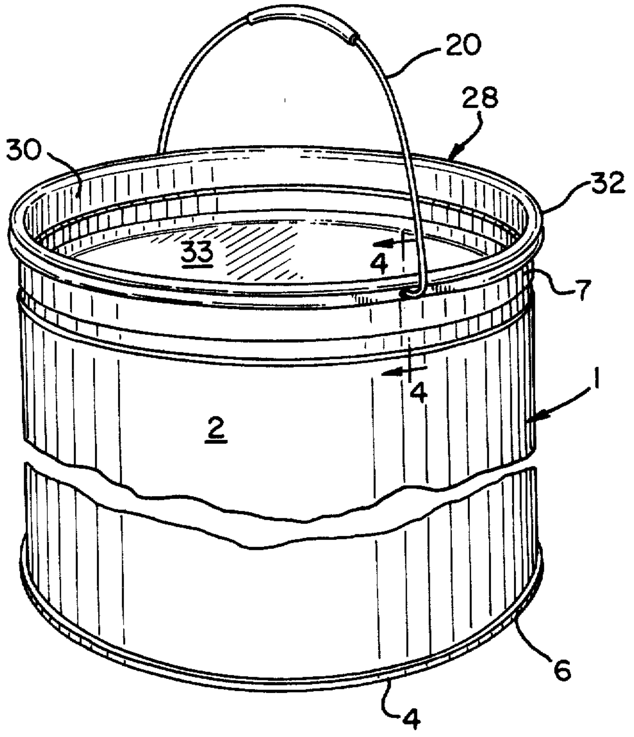
FIG. 1 is a perspective view of the novel paint pail.
Figure 3:
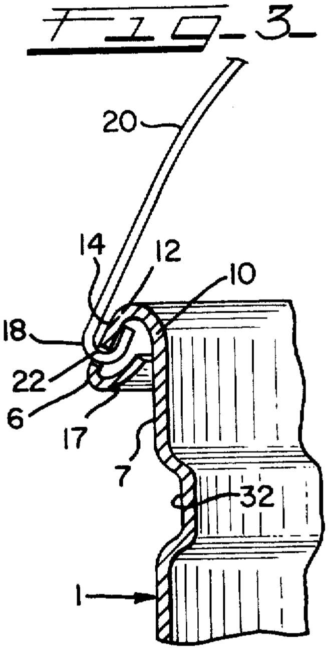
FIG. 3 is a side elevational view of a portion of the pair with the bail shown preparatory to crimping of the curl.
Figure 2:
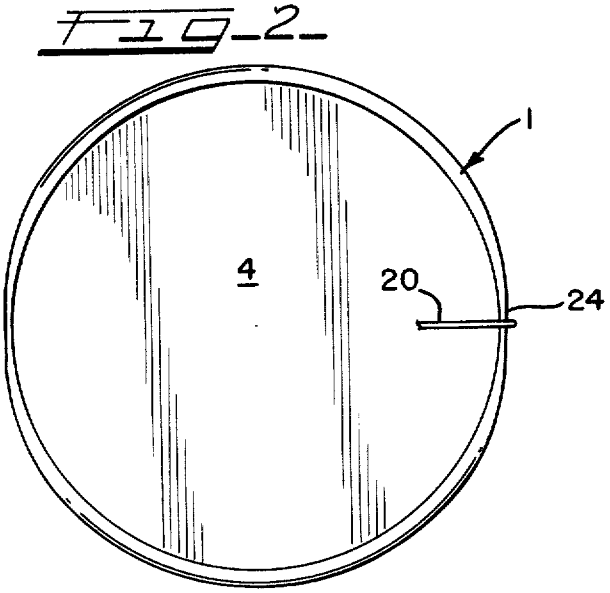
FIG. 2 is a top plan view thereof.
Figure 4:
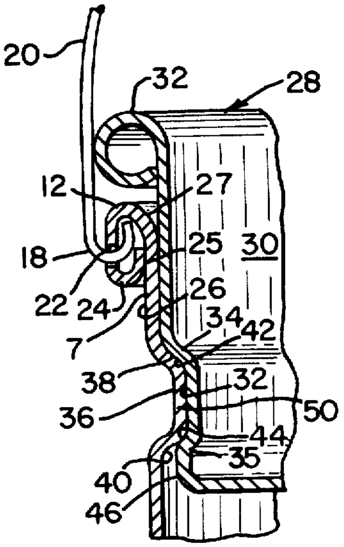
FIG. 4 shows the container with curl and bail fully crimped and the plug applied to the container.

As best seen in FIG. 3, a bail hook 18, there being one at each end of the bail 20, is inserted through an aperture 22 formed in the outer wall 14. After insertion of the bail hooks into the respective apertures provided at diametrically opposite sides of the pail, the adjacent section 24 of the curl is crimped and flattened (FIGS. 2 and 4) and wall 14 assumes a vertical position and the bottom wall is curved into a U-shape providing a bottom bight portion 24 and an upright inner flange which is buttressed at 25 against the exterior side 26 of the upper portion of the body.

The upwardly flaring inner surface 27 of the upper portion of the pail provides an effective pilot for the plug or cover 28 which has an annular side wall 30 with a curl 32 about its upper edge, the sidewall 30 being integral with a center panel 33 forming the lower end of the plug.

The side wall 30 of the plug is formed adjacent to its lower edge with an external channel or groove 32 which is defined along its upper and lower edges by ledges 34,35.

The groove 32 receives an annular bead 36 which is formed in the upper portion of the can body and projects into the interior of the can and has upper and lower inwardly radially converging guide and locking faces 38,40 mating with complimentary faces 42,44 on the ledges 34,35.

It will be appreciated that as the plug is forced into the open end of the container, the bottom convex face 46 adjoining the bottom panel with the ledge 35 will cam over the surface 38 and ride on the vertical wall 50 and then snap under surface 40.

EMBODIMENT OF FIGS. 5–8

In the present embodiment, as well as all the others which are similar to FIGS. 1–4, the same parts in each will be identified with the same reference numerals.

In the present instance the curl 8 is cut at 60,62 and 64,66 to provide ear segments 68,70 and at opposite sides of the segment 68,70 the curl is bent or flattened toward the can body at 72,74 and 76,78 to provide access spaces 80,82 and 84,86 at opposite sides of the respective ears for the ring shaped hook ends 88,90 of the bail 92. The bail thus is accommodated pivotal movement about an axis extending radially with respect to the axis of the paint can.

EMBODIMENT OF FIGS. 9–12

In this embodiment the curl 8 is lanced circumferentially at 100 and 101 at diametrically opposite sides of the can and cut radially at 102, 103 at one end of each lance. The segments 104,106 of the curl are then bent outwardly to form loops 108 in the plane of the curl and provide vertical apertures 112 which receive the hook ends 114 at the ends of the bail 115 for pivoting about a radial axis of the container.

The free end 116 of each loop may be welded to the adjacent body portion or secured by solder or by a suitable adhesive at 117.

EMBODIMENT OF FIG. 13

In this embodiment the curl is slit as in the previous embodiment but not cut at one end so that the section 150 is continuous with the curl.

The curl section 150 is then flattened transversely of the can body and pulled outwardly therefrom to form an ear or an eye 152 for the hook end 114 of the bail 115.

Thus in each embodiment the curl is advantageously used to form the ear for hooking onto the bail without requiring additional parts or metal.

It will be understood that various other modifications will now become apparent to those skilled in the art which comes within the scope of the appended claims.

What is claimed is:

1. A container having a body including a bottom and an upper edge with an integral outward curl,
 a bail,
 and means on said curl for pivotally hanging said container from the bail,
 and said means on said curl comprising a portion of said curl cut away from said body and offset therefrom to provide a bail-engaging eye structure,
 and said portion of said curl having an end separated along a radial cut from the remainder of the curl and being bent in toward the body portion, and means securing said end to the body portion.

2. A container having a body including a bottom and an upper edge with an integral outward curl,
 a bail,
 and means on said curl for pivotally hanging said container pail from the bail, and said means forming ears from the curl at diametrically opposite sides of the container separated from the remainder of the curl and having limited dimensions circumferentially of the container, said curl having crimped ends at opposite sides of each ear providing entry ways for the bail into said ears.

3. In a paint can or the like having a body with a bottom at one end, an opening at its other end encompassed by an outwardly directed curl of tubular cross-section, said curl being cut at diametrically opposite sides of the can to provide bail ears having bail-admitting openings therethrough, and said curl having sections extending between said ears with end portions of said sections flanking each ear and being crimped at an incline toward said body to provide bail access way, for the ends of an associated bail.

4. A method of making bail securements on a container having a body portion and an outturned curl along its upper edge comprising:
 forming from material a container having a bottom, a cylindrical body and an outturned curl about the upper edge of the body,
 cutting out bail-engaging portions of the curl to provide a bail receiving opening,
 then deforming portions of the curl for clearing the bail from obstruction against the curl;
 then entering of the ends of the bail into said curl portions to accommodate swinging movements of the bail.

5. The invention according to claim 4 wherein the portions being deformed are the bail engaging portions.

6. The invention according to claim 4 wherein the portions being deformed are located at opposite ends of the bail engaging portions.

7. The invention according to claim 4 and cutting said bail-engaging portions circumferentially of the body and deforming said bail engaging portions away from the body.

* * * * *